(12) United States Patent
Tang et al.

(10) Patent No.: US 9,608,844 B2
(45) Date of Patent: Mar. 28, 2017

(54) SYSTEM AND METHOD FOR PERFORMING CHANNEL ESTIMATION ON AN OFDM SIGNAL

(71) Applicant: NXP B.V., Eindhoven (NL)

(72) Inventors: Weihua Tang, Eindhoven (NL); Semih Serbetli, Eindhoven (NL)

(73) Assignee: NXP B.V., Eindhoven (NL)

(*) Notice: Subject to any disclaimer, the term of this patent is extended or adjusted under 35 U.S.C. 154(b) by 23 days.

(21) Appl. No.: 14/287,778

(22) Filed: May 27, 2014

(65) Prior Publication Data
US 2015/0349981 A1    Dec. 3, 2015

(51) Int. Cl.
*H04L 25/02* (2006.01)
*H04L 27/26* (2006.01)
*H04L 27/227* (2006.01)

(52) U.S. Cl.
CPC ...... *H04L 25/0238* (2013.01); *H04L 25/0204* (2013.01); *H04L 25/0212* (2013.01); *H04L 27/227* (2013.01); *H04L 27/26* (2013.01); *H04L 27/2601* (2013.01)

(58) Field of Classification Search
CPC ... H03K 9/00; H04B 1/10; H04B 1/38; H04B 1/707; H04B 7/00; H04B 7/208; H04B 15/00; H04B 17/00; H04L 1/10; H04L 7/00; H04L 25/022; H04L 27/00; H04L 27/01; H04L 27/06; H04L 27/14; H04L 27/26; H04L 27/28; H04L 25/02; H04L 25/0238; H04L 27/2601; H04K 1/10; H04J 11/00; H04M 1/00; H04W 84/12

USPC ....... 370/203, 206, 252, 338, 344, 465, 487; 375/142, 224, 227, 232, 259, 260, 316, 375/344, 346, 350, 354, 371; 455/59, (Continued)

(56) References Cited

U.S. PATENT DOCUMENTS 7,929,620 B2 * 4/2011 Kim .................... H04L 25/0248
                                                                  370/203
8,532,203 B1    9/2013 Riani et al.
(Continued)

FOREIGN PATENT DOCUMENTS

EP           2328311 A2     6/2011

OTHER PUBLICATIONS

Mackenthun, Kenneth M. Jr.; "A Fast Algorithm for Multiple-Symbol Differential Detection of MPSK"; IEEE Transactions on Communications, vol. 42, No. 2/3/4; pp. 1471-1474; 1994.
(Continued)

*Primary Examiner* — Shawkat M Ali (57) ABSTRACT

Embodiments of systems and methods for performing channel estimation on Orthogonal frequency-division multiplexing (OFDM) signals are described. In one embodiment, a method for performing channel estimation on an OFDM signal involves performing blind channel phase estimation on an OFDM signal to obtain channel phase information and performing blind channel magnitude estimation on the OFDM signal to obtain channel magnitude information. Each of performing blind channel phase estimation on the OFDM signal and performing blind channel magnitude estimation on the OFDM signal involves detecting and suppressing a signal path of the OFDM signal. Other embodiments are also described.

19 Claims, 9 Drawing Sheets

(58) Field of Classification Search
USPC ......... 455/67.11, 306, 501, 516, 522, 550.1; 708/403

See application file for complete search history.

(56) References Cited

U.S. PATENT DOCUMENTS

| | | | | |
|---|---|---|---|---|
| 8,989,762 | B1* | 3/2015 | Negus | H04W 24/02 370/341 |
| 2004/0076112 | A1* | 4/2004 | Chen | H04L 25/022 370/208 |
| 2005/0073947 | A1* | 4/2005 | Dey et al. | 370/208 |
| 2006/0285604 | A1* | 12/2006 | Walton | H04L 1/0002 375/267 |
| 2009/0290664 | A1* | 11/2009 | Walton et al. | 375/344 |
| 2010/0002783 | A1* | 1/2010 | Qi et al. | 375/260 |
| 2010/0284478 | A1* | 11/2010 | Liao et al. | 375/260 |
| 2010/0296568 | A1* | 11/2010 | Bury | 375/227 |
| 2010/0322327 | A1* | 12/2010 | Caire | H04B 3/54 375/260 |

OTHER PUBLICATIONS

Hagneauer, Joachim et al.; "A Viterbi Algorithm with Soft-Decision Outputs and its Applications"; German Aerospace Research Establishment (DLR) Institute for Communications Technology; pp. 1680-1686; 1989.

Peleg, M. et al.; "Iterative decoding for coded noncoherent MPSK communications over phase-noisy AWGN channel"; IEEE Proc.-Commun., vol. 147, No. 2; pp. 87-95; Apr. 2000.

van Houtum, Wim J. et al.; "Joint and iterative detection and decoding of differentially encoded COFDM systems"; 2010 17th International Conference on Telecommunications; IEEE; pp. 36-42; 2009.

Chen, Rong-Rong et al.; "Joint Noncoherent Demodulation and Decoding for the Block Fading Channel: A Practical Framework for Approaching Shannon Capacity"; IEEE Transactions on Communications, vol. 51, No. 10; pp. 1676-1689; Oct. 2003.

Divsalar, Dariush et al.; "Multiple-Symbol Differential Detection of MPSK"; IEEE Transactions on Communications, vol. 38, No. 3; pp. 300-308; Mar. 1990.

Bahl, L.R. et al.; "Optimal Decoding of Linear Codes for Minimizing Symbol Error Rate"; IEEE Transactions on Information Theory; pp. 284-287; Mar. 1974.

Berger, Christian R. et al.; "Application of Compressive Sensing to Sparse Channel Estimation"; IEEE Communications Magazine; pp. 164-174; Nov. 2010.

Cenelec; "Characteristics of DAB Receivers"; NEN-EN-IEC 62104.2008; pp. 1-26; 2008.

Chen, Yun et al.; "Algorithm and VLSI Architecture of Channel Estimation Impaired by Impulsive Noise in PLC"; IEEE 56th International Midwest Symposium on Circuits and Systems; pp. 932-935; Aug. 4, 2013.

Necker, Marc C. et al.; "Totally Blind Channel Estimation for OFDM on Fast Varying Mobile Radio Channels"; IEEE Transctions on Wireless Communications, vol. 3, No. 5; IEEE Service Center, Piscataway, NJ; pp. 1514-1525; Sep. 2004.

Extended European Search Report, 15168769.6; Sep. 17, 2015.

* cited by examiner

SYSTEM AND METHOD FOR PERFORMING CHANNEL ESTIMATION ON AN OFDM SIGNAL

Channel estimation plays an important role in communication systems. Normally, a certain amount of pilots are inserted to a carrier by a transmitter to enable channel estimation on a corresponding receiver. However, some communications systems have no pilots or not enough pilots required for accurate channel estimation. Examples of such communications systems include a Digital Audio Broadcasting (DAB) system for digital radio and a terrestrial transmission Digital Multimedia Broadcasting (T-DMB) system. Another example of such a communications system is a vehicle communications system compatible with the Institute of Electrical and Electronics Engineers (IEEE) 802.11p standard, which typically has only 4 pilots out of 64 subcarriers. Accurate channel estimation can be difficult for vehicle communications systems that are compatible with the IEEE 802.11p standard because of device mobility and long delay paths. In such communications systems (e.g. DAB, T-DMB) that have no pilots or not enough pilots required for accurate channel estimation and are differential modulated systems, demodulation is performed without channel estimation or channel equalization and modulated signals are demodulated with a non-coherent receiver. For example, a differential demodulator can demodulate differential modulated symbols without channel estimation or channel equalization. In such communications systems (e.g. IEEE 802.11P) that do not have enough pilots required for accurate channel estimation and are coherent modulated system, demodulation is performed by coherent receiver with inaccurate channel estimation and channel equalization.

There are several drawbacks associated with differential demodulation without channel estimation or channel equalization. For example, a first drawback is that two noise sources affect the differential demodulation process because differential modulation data is encoded in two symbols. Another drawback is that there is an assumption that the channel remains almost static during the two symbols. However, this assumption does not always hold true. In systems where differential modulation is applied in the time domain, the channel changes due to device mobility. In systems where differential modulation is applied in the frequency domain over successive subcarriers of an OFDM symbol, the channel changes due to frequency selectivity of the multipath channel. The frequency selectivity can become severe especially in a Single Frequency Network (SFN) deployment, which is usually preferred by broadcasters due to its spectrum efficiency.

In recent years, there have been several different approaches to improve the performance of differential modulation systems and to close the performance gap between coherent and non-coherent reception. One approach is described by Divsalar and Simon (D. Divsalar and M. Simon, "Multiple-symbol differential detection of MPSK", IEEE Transactions on Communications, vol. 38, no. 3, pp. 300-308, March 1990), where the use of multiple symbol differential detection (MSDD) is proposed. This approach is based on block processing and it is assumed that the channel does not change during a block of differentially modulated symbols, i.e., N (where N is an integer larger than one) symbols in a block, and all symbol sequence possibilities are considered to find the most likely transmitted symbol sequence. Although this approach has shown to be effective, it is computationally complex, i.e., symbol sequence probabilities have to be compared for a block of N D-MPSK modulated signals. Some simplifying algorithms have been proposed for MSDD by Mackenthun (K. M. Mackenthun, Jr. "A Fast Algorithm for Multiple-Symbol Differential Detection of MPSK", IEEE Transactions on Communications, vol. 42, pp. 1471 "U 1474, February/March/April 1994). However, this approach considers only uncoded systems. Some approaches based on trellis demodulation have been described by Peleg et al. (M. Peleg, S. Shamai, and S. Galan, "Iterative decoding for coded noncoherent MPSK communications over phase-noisy AWGN channel", IEE Proceedings on Communications, vol. 147, no. 2, pp. 87" U95, April 2000), Chen et al. (R.-R. Chen, R. Koetter, U. Madhow, and D. Agrawal, "Joint noncoherent demodulation and decoding for the block fading channel: a practical framework for approaching Shannon capacity", IEEE Transactions on Communications, vol. 51, no. 10, October 2003), and van Houtum et al. (W. J. van Houtum, F. M. J. Willems, "Joint and iterative detection and decoding of differentially encoded COFDM systems", 2010 IEEE 17th International Conference on Telecommunications (ICT), vol., no., pp. 36-43, 4-7 Apr. 2010). A commonality of these approaches is that they use a trellis demodulator where each state of the trellis represents a state of the received signal based on the assumed channel phase and transmitted symbol. A trellis decoder described by Bahl et al. (L. Bahl, J. Cocke, F. Jelinek, and J. Raviv, "Optimal decoding of linear codes for minimizing symbol error rate (corresp.)", IEEE Transactions on Information Theory, vol. 20, no. 2, pp. 284" U287, March 1974) or the soft output Viterbi algorithm proposed by Hagenauer et al. (J. Hagenauer, P. Hoeher, "A Viterbi algorithm with soft-decision outputs and its applications", in proc. IEEE GLOBECOM, pp. 47.11-47.17, Dallas, Tex., November 1989) are used to generate the soft bits from the trellis structure that is to be fed into the rest of the receiver chain. These approaches are shown to be effective to close the performance gap between coherent and non-coherent reception. However, these trellis based approaches are also computationally complex. For example, these trellis based approaches require a trellis based soft-output demodulator with a large number of trellis states. In addition, when the channel changes during the assumed block, these trellis based approaches generally fail to correct any phase changes since there is no transition between the channel phase states.

Embodiments of systems and methods for performing channel estimation on Orthogonal frequency-division multiplexing (OFDM) signals are described. In one embodiment, a method for performing channel estimation on an OFDM signal involves performing blind channel phase estimation on an OFDM signal to obtain channel phase information and performing blind channel magnitude estimation on the OFDM signal to obtain channel magnitude information. Each of performing blind channel phase estimation on the OFDM signal and performing blind channel magnitude estimation on the OFDM signal involves detecting and suppressing a signal path of the OFDM signal. Other embodiments are also described. By detecting and suppressing a signal path (a true pure noise signal path) of the OFDM signal, the reception quality for different channels, including (single frequency network) SFN channels, can be improved and coherent demodulation of an OFDM signal can be enabled. Other embodiments are also described.

In another embodiment, a system for performing channel estimation on an OFDM signal includes a channel phase estimation module configured to perform blind channel phase estimation on an OFDM signal to obtain channel phase information and a channel magnitude estimation module configured to perform blind channel magnitude estimation on the OFDM signal to obtain channel magnitude information. The channel phase estimation module and the channel magnitude estimation module are also configured to detect and suppress a signal path of the OFDM signal.

In another embodiment, a method for performing channel estimation on an OFDM signal involves performing blind channel phase estimation on an OFDM signal to obtain channel phase information and performing blind channel magnitude estimation on the OFDM signal to obtain channel magnitude information. Performing channel phase estimation involves performing an exponentiation operation on the OFDM signal to generate an exponentiation signal, performing an Inverse Fast Fourier transform on the exponentiation signal to generate a time domain signal, detecting and removing a pure noise signal path of the time domain signal to generate a processed time domain signal, performing a Fast Fourier transform on the processed time domain signal to generate a frequency domain signal, calculating a phase of the frequency domain signal, and dividing the phase of the frequency domain signal to obtain the channel phase information. Performing the channel magnitude estimation on the OFDM signal involves detecting and suppressing a pure noise signal path of the OFDM signal.

Other aspects and advantages of embodiments of the present invention will become apparent from the following detailed description, taken in conjunction with the accompanying drawings, depicted by way of example of the principles of the invention.

Throughout the description, similar reference numbers may be used to identify similar elements.

It will be readily understood that the components of the embodiments as generally described herein and illustrated in the appended figures could be arranged and designed in a wide variety of different configurations. Thus, the following detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment. Rather, language referring to the features and advantages is understood to mean that a specific feature, advantage, or characteristic described in connection with an embodiment is included in at least one embodiment. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment. Thus, the phrases "in one embodiment," "in an embodiment," and similar language throughout this specification may, but do not necessarily, all refer to the same embodiment.

Figure 1:
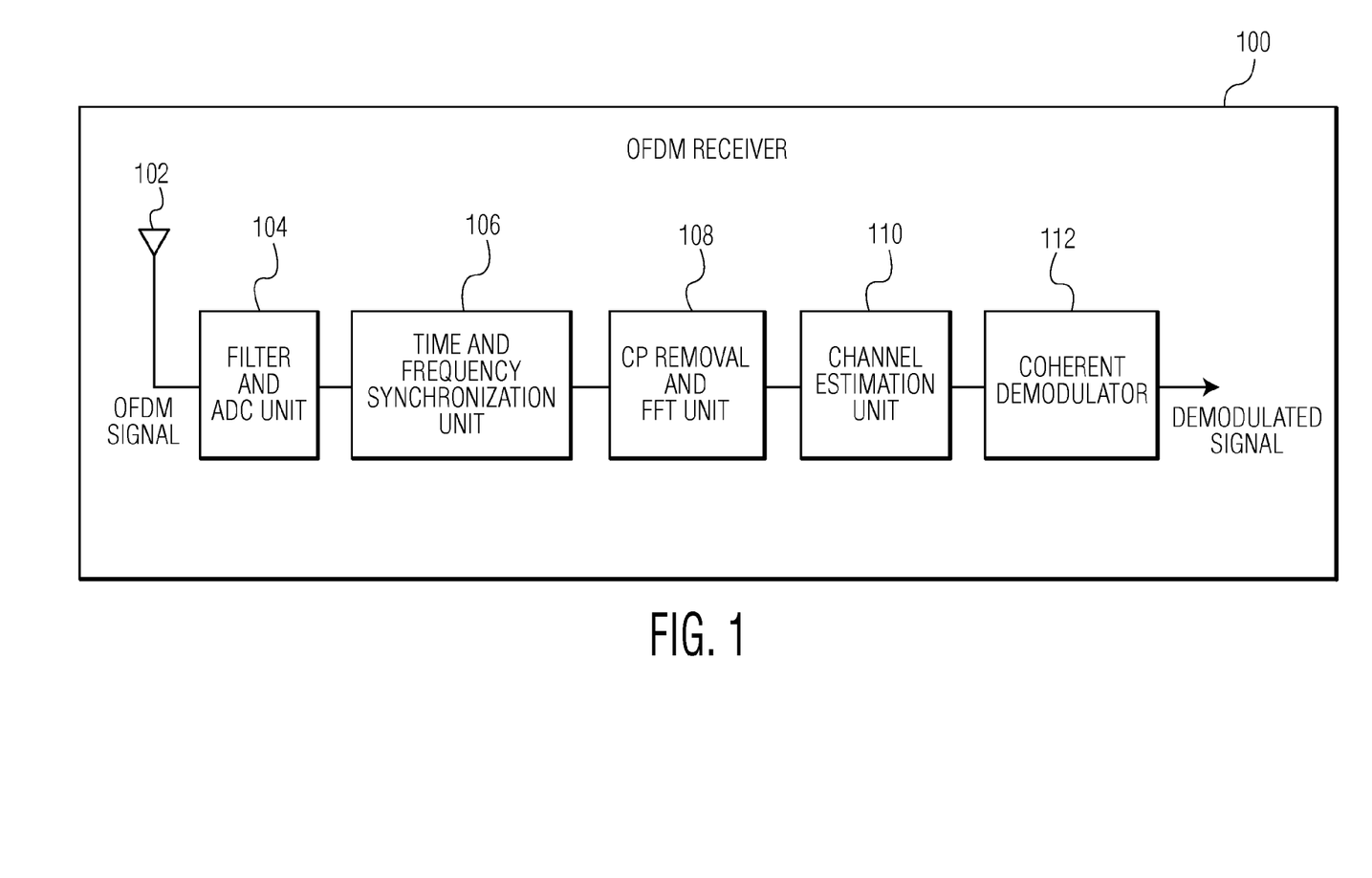
FIG. 1 is a schematic block diagram of an OFDM receiver in accordance with an embodiment of the invention.

FIG. 1 is a schematic block diagram of an OFDM receiver 100 that is used to demodulate an OFDM signal in accordance with an embodiment of the invention. In some embodiments, the OFDM receiver is a coherent demodulation receiver. In some embodiments, the OFDM signal is a differential modulated signal. Orthogonal Frequency Division Multiplexing (OFDM) uses a number of closely-spaced orthogonal sub-carriers to carry data over a wireless channel. Due to its robustness against the multipath spread of the channel and its high spectral efficiency, OFDM is widely adopted in various wireless standards.

In the embodiment depicted in FIG. 1, the OFDM receiver 100 includes an antenna unit 102, a filter and analog to digital converter (ADC) unit 104, a time and frequency synchronization unit 106, a cyclic prefix (CP) removal and Fast Fourier transform (FFT) unit 108, a channel estimation unit 110, and a coherent demodulator 112. The OFDM receiver can be implemented in hardware, such as a processor or a receiver circuit and/or software (e.g., computer instructions) stored in a computer-readable storage medium (e.g., memory, cache, disk). Although the OFDM receiver is shown in FIG. 1 as including certain components, in some embodiments, the OFDM receiver includes less or more components to implement less or more functionalities.

The antenna unit 102 of the OFDM receiver 100 is configured to receive an OFDM signal. The OFDM signal may be a differential modulated signal or a non-differential modulated signal. Although the antenna unit is shown in FIG. 1 as including one antenna, in some embodiments, the antenna unit includes less or more components to implement less or more functionality.

The filter and ADC unit 104 of the OFDM receiver 100 is configured to filter the received OFDM signal and to convert the received OFDM signal from analog format into a digital signal.

The time and frequency synchronization unit 106 of the OFDM receiver 100 is configured to perform time domain synchronization and frequency domain synchronization on the digital signal, which is received from the filter and ADC unit 104, to generate a synchronized digital signal.

The cyclic prefix removal and FFT unit 108 of the OFDM receiver 100 is configured to remove a cyclic prefix from the synchronized digital signal, which is received from the time and frequency synchronization unit 106, and to perform a Fast Fourier transform on the synchronized digital signal, to generated a processed signal.

The channel estimation unit 110 of the OFDM receiver 100 is configured to perform channel estimation on the received OFDM signal. In the embodiment depicted in FIG. 1, the channel estimation unit is configured to perform channel estimation on the processed signal, which is received from the cyclic prefix removal and FFT unit 108. The channel estimation unit may produce estimated channel phase information and/or estimated channel magnitude information. In some embodiments, the channel estimation unit detects and suppresses a signal path of the OFDM signal. In a wireless channel, a limited number of paths, also called taps, carry most of the energy. The rest of paths are pure noise signal paths/taps. In some embodiments, all taps are noisy. However, taps that carries or contains only noise, which are also referred to as pure noisy taps, need to be suppressed. A pure noise signal path/tap may be caused by, for example, interference from other signal sources, by device mobility, and/or by the channel environment. In some embodiments, a pure noise signal path/tap is a signal channel that has a relatively large signal to noise ratio (SNR). By detecting and suppressing a pure noise signal path of the OFDM signal, the channel estimation unit can provide accurate channel estimation for OFDM systems that need blind channel estimation. The channel estimation unit enables coherent demodulation and improves the reception quality for different channels, including (single frequency network) SFN channels.

The coherent demodulator 112 is configured to perform coherent demodulation on the OFDM signal based on the channel estimation information from the channel estimation unit 110.

Figure 2:
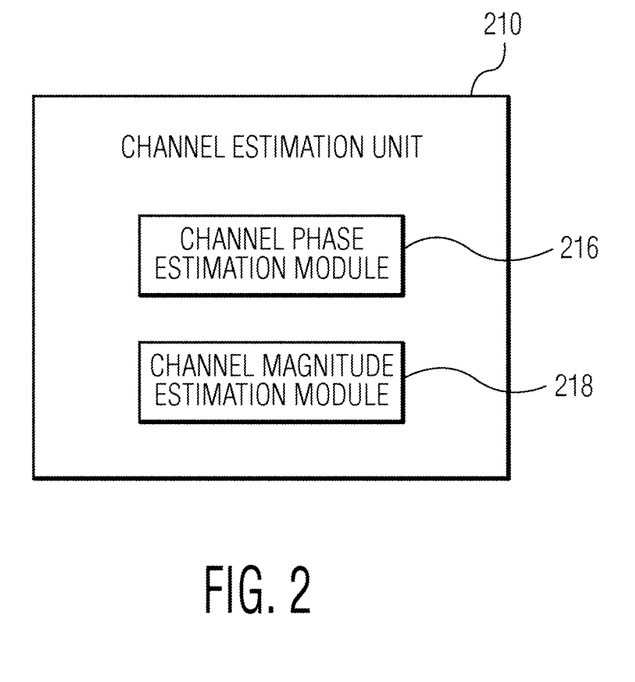
FIG. 2 depicts an embodiment of the channel estimation unit depicted in FIG. 1.

FIG. 2 depicts an embodiment of the channel estimation unit 110 depicted in FIG. 1. In the embodiment depicted in FIG. 2, a channel estimation unit 210 includes a channel phase estimation module 216 and a channel magnitude estimation module 218. The channel estimation unit 210 depicted in FIG. 2 is one possible embodiment of the channel estimation unit 110 depicted in FIG. 1. However, the channel estimation unit 110 depicted in FIG. 1 is not limited to the embodiment shown in FIG. 2.

The channel phase estimation module 216 is configured to perform blind channel phase estimation on an OFDM signal to obtain channel phase information or to obtain a shifted version of the channel phase information. In some embodiments, a blind channel phase estimation is a channel phase estimation that is performed without any reference symbols (e.g., pilot symbols). The channel phase estimation module can detect and suppress a pure noise signal path of the OFDM signal.

Figure 3:
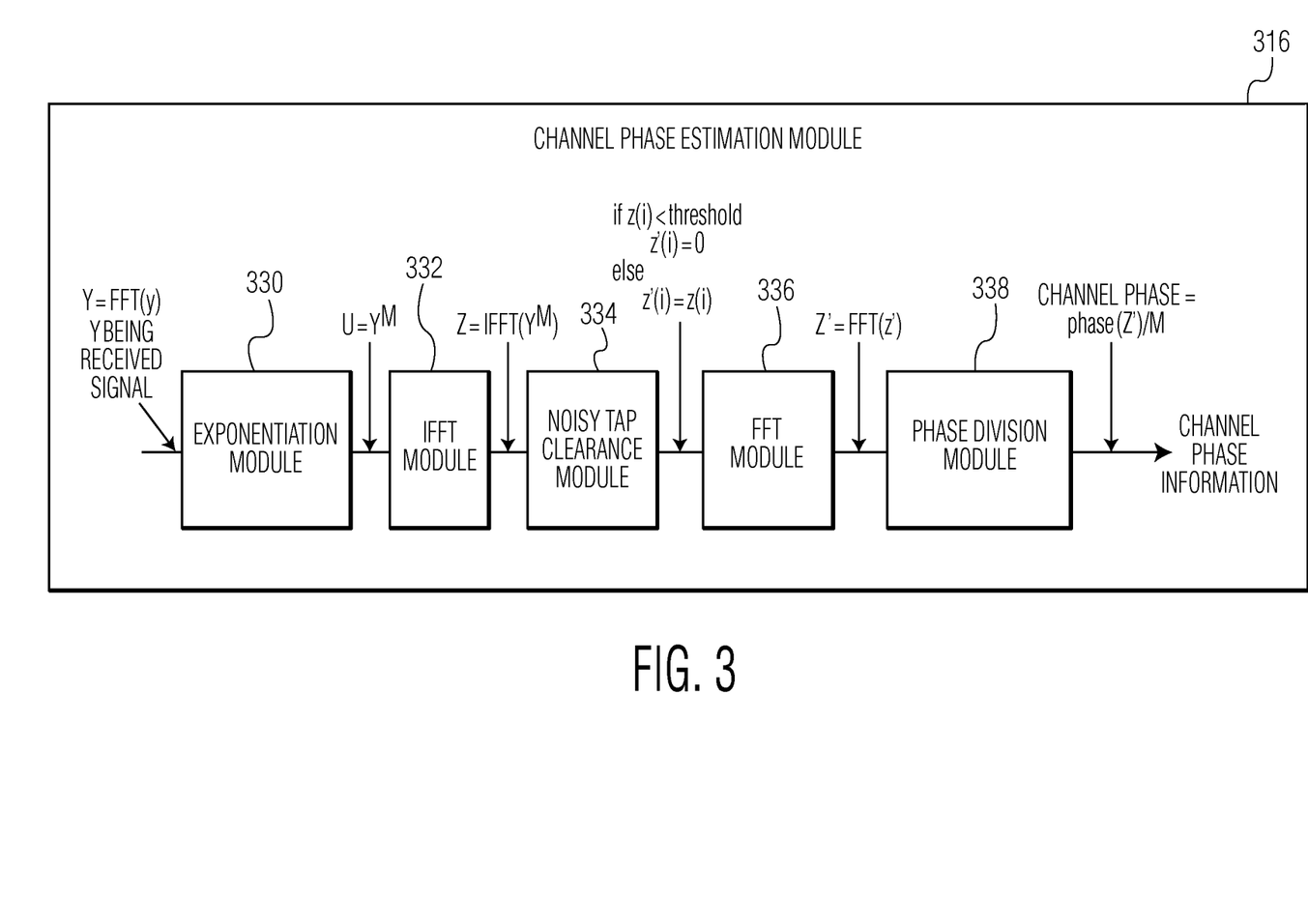
FIG. 3 depicts an embodiment of the channel phase estimation module depicted in FIG. 2.

FIG. 3 depicts an embodiment of the channel phase estimation module 216 depicted in FIG. 2. In the embodiment depicted in FIG. 3, a channel phase estimation module 316 includes an exponentiation module 330, an Inverse Fast Fourier transform (IFFT) module 332, a noisy tap clearance module 334, an FFT module 336, and a phase division module 338. The channel phase estimation module can be implemented in hardware, such as a processor and/or software (e.g., computer instructions) stored in a computer-readable storage medium (e.g., memory, cache, disk). The channel phase estimation module 316 depicted in FIG. 3 is one possible embodiment of the channel phase estimation module 216 depicted in FIG. 2. However, the channel phase estimation module 216 depicted in FIG. 2 is not limited to the embodiment shown in FIG. 3. For example, although the IFFT module and the FFT module are used in the channel phase estimation module depicted in FIG. 3, in other embodiments, other types of transformations (e.g., Inverse Discrete Fourier transform (IDFT) or Discrete Fourier transform (DFT)) can be performed.

The exponentiation module 330 is configured to perform an exponentiation operation on an OFDM signal to generate an exponentiation signal or a scaled version of an exponentiation signal. The OFDM signal may be a differential modulated signal or a non-differential modulated signal. In some embodiments, the exponentiation module is configured to calculate the M-th (M is an integer that is a power of 2, e.g., 2, 4, 8, 16 . . . ) power of a received OFDM signal or a scaled version of the M-th power of the received OFDM signal. Subsequently, the M-th power of the OFDM signal or the scaled version of the M-th power of the OFDM signal can be used to generate virtual pilots, as described below.

In an example, s, H and y are used to represent a transmitted Phase-shift keying (PSK) modulated signal, the channel and a received signal, respectively. The transmitted signal, s, can be expressed as:

$$s = Ae^{j\left(\frac{2\pi}{M}d\right)} \quad (1)$$

Where
 A represents the magnitude of transmitted signal,
 M represents the order of PSK modulation,
 d represents the information data to be transmitted.
The channel, H, can be expressed as:

$$H = |H|e^{j\phi} \quad (2)$$

Where
 |H| represents the channel magnitude,
 φ represents the channel phase.
The received signal, y, can be expressed as:

$$y = |H|Ae^{j\left(\frac{2\pi}{M}d+\varphi\right)} + n \quad (3)$$

Where
 |H| represents the magnitude of channel,
 φ represents the phase of channel,
 n represents noise.
In an embodiment, M is equal to 4 (e.g., for quadrature phase shift keying (QPSK)). The 4-th power of the received signal y can be represented as:

$$y^4 = H^4s^4 + 4H^3s^3n + 6H^2s^2n^2 + 4Hsn^3 + n^4 \quad (4)$$

If $\zeta = 4H^3s^3n + 6H^2s^2n^2 + 4Hsn^3 + n^4$, and without losing generality, A is set to be equal to 1, the 4-th power of the received signal y can be represented as:

$$y^4 = |H|^4 e^{j(2\pi d + 4\phi)} + \zeta = |H|^4 e^{j(4\phi)} + \zeta \quad (5)$$

As revealed in equation (5), the impact of data bits is removed from the received signal and virtual pilots ($|H|^4 e^{j(4\phi)}$ with 4 times the phase of the channel and the noise part $\zeta$ are obtained. The obtained virtual pilots are used to estimate the channel phase φ or φ', where $|\phi - \phi'| = 2\pi k/4$ and k=1, 2, 3 may be obtained. Because data bits are modulated on the difference between OFDM symbols in differential modulation systems, an error of 2πk/4 on the channel phase does not cause demodulation errors, as long as the same phase shift is applied to both OFDM symbols.

Although virtual pilots can be derived from the M-th power of the OFDM signal, these virtual pilots generally contain high noise. To reduce noise in the virtual pilots, filtering can be performed in the frequency domain between subcarriers or in the time domain between OFDM symbols. However, frequency domain filtering only works for short delay channels. When the channel is severely frequency selective, the difference between neighboring subcarrier channels is too large to get accurate channel estimation. Time domain filtering works in a static situation but performs poorly when the corresponding device is moving about. In the embodiment depicted in FIG. 3, the channel phase estimation module 316 uses the noisy tap clearance module 334 to reduce noise in the virtual pilots.

The IFFT module 332 is configured to perform an Inverse Fast Fourier transform on the exponentiation signal from the exponentiation module 330 to obtain/generate a corresponding time domain signal. Although the IFFT module is used in the channel phase estimation module 316 depicted in FIG. 3, in other embodiments, other types of transformations (e.g., Inverse Discrete Fourier transform (IDFT)) can be performed on the exponentiation signal from the exponentiation module to obtain/generate a corresponding time domain signal.

The noisy tap clearance module 334 is configured to detect and suppress a pure noise signal path of an OFDM signal. Multiple techniques can be used to detect if a tap is a strong path or a noisy/weak path. In the embodiment depicted in FIG. 3, the noisy tap clearance module detects and suppresses or removes a pure noise signal path of the time domain signal from the IFFT module 332 to generate a processed time domain signal. In some embodiments, the noisy tap clearance module compares a time domain value of the time domain signal, which corresponds to a signal path of the time domain signal, with a threshold. In these embodiments, if the time domain value is lower than the threshold, the noisy tap clearance module reduces the time domain value, for example, to zero. In some embodiments, the noisy tap clearance module calculates a threshold based on the mean and/or standard deviation of the magnitude of an OFDM signal and then removes any tap/channel path whose magnitude is lower than the threshold. In an embodiment, the noisy tap clearance module uses a signal to noise ratio (SNR) to determine the threshold. In some embodiments, the noisy tap clearance module obtains the delay statistics of the channel and uses the delay statistics of the channel to identify which taps are noise taps. In an embodiment, the noisy tap clearance module sets a maximum delay of the channel and identifies all taps above the maximum delay as noise taps.

Figure 4:
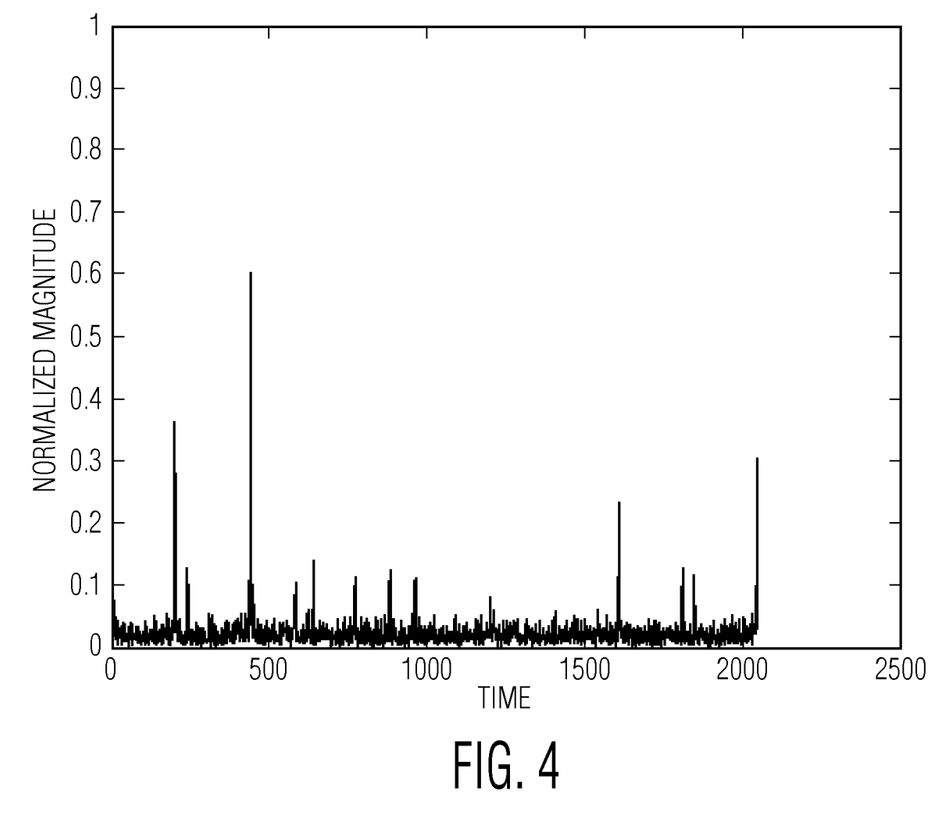
FIG. 4 shows an example of the normalized magnitude of an OFDM signal.
Figure 5:
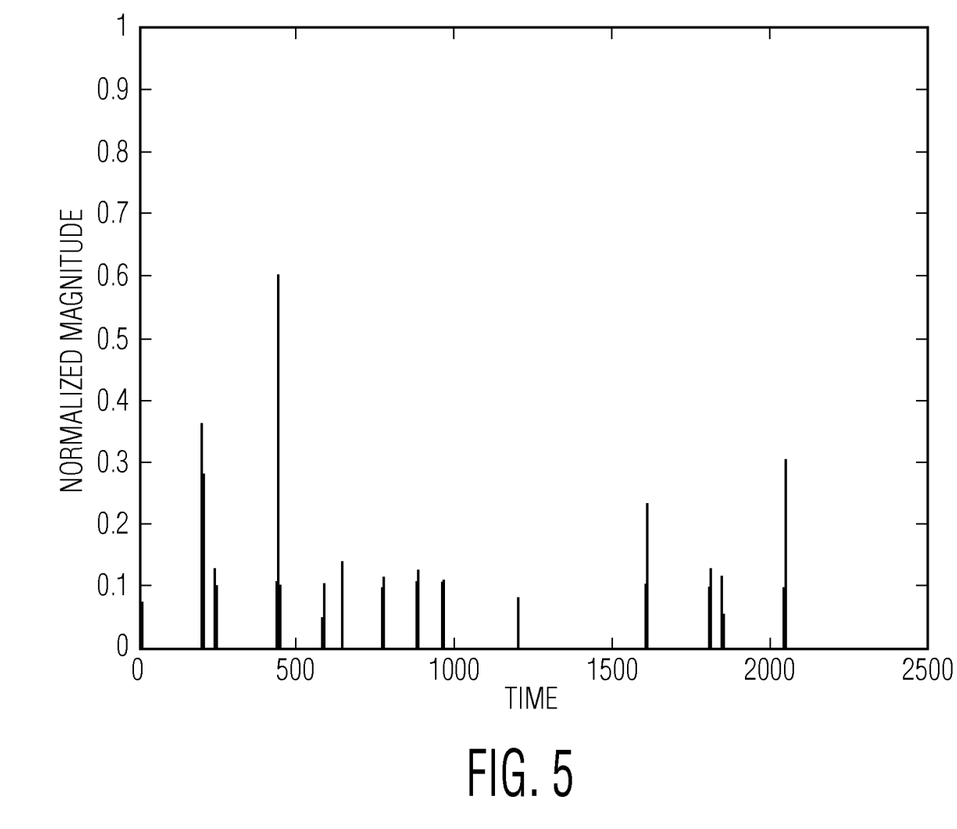
FIG. 5 shows an example of the normalized magnitude of the OFDM signal depicted in FIG. 4 after noisy taps clearance.

FIG. 4 is a graph of a signal magnitude versus time, which illustrates an example of the normalized magnitude of an OFDM signal. The normalized magnitude shown in FIG. 4 is equivalent to the channel convolved by M times. FIG. 5 is a graph of a signal magnitude versus time, which illustrates an example of the normalized magnitude of the OFDM signal depicted in FIG. 4 after noisy taps clearance performed by the noisy tap clearance module 334. As shown in FIG. 5, the normalized magnitude is less noisy than the normalized magnitude shown in FIG. 4. The noisy tap clearance module can produce lower noise virtual pilots which leads to more accurate phase estimation.

Turning back to FIG. 3, the FFT module 336 is configured to perform a Fast Fourier transform to convert the virtual pilot signals back to the frequency domain by generating a frequency domain signal. In an embodiment, it can be cost effective to do channel equalization in the frequency domain. Although the FFT module is used in the channel phase estimation module 316 depicted in FIG. 3, in other embodiments, other types of transformations (e.g., Discrete Fourier transform (DFT)) can be performed to convert the virtual pilot signals back to the frequency domain by generating a frequency domain signal.

The phase division module 338 is configured to calculate a phase of the frequency domain signal from the FFT module and to divide the phase of the frequency domain signal to obtain the channel phase information or a shifted version of the channel phase information. In an embodiment, the phase division module is configured to calculate the phase of each virtual pilot and then divide the calculated phase to obtain the channel phase information or a shifted version of the channel phase information.

An example of the operation of the channel phase estimation module 316 depicted in FIG. 3 is described as follows. The exponentiation module 330 calculates the M-th (M is an integer that is a power of 2, e.g., 2, 4, 8, 16 . . . ) power of a Phase-shift keying (PSK) modulated signal. The M-th power signal can be expressed as:

$$U = Y^M, \qquad (6)$$

where Y represents the Phase-shift keying (PSK) modulated signal, U represents the M-th power of the received frequency domain signal, "Y," and M represents the order of PSK modulation. The IFFT module 332 performs an Inverse Fast Fourier transform on the M-th power signal of the received frequency domain signal to obtain a corresponding time domain signal, which can be expressed as:

$$Z = IFFT(Y^M), \qquad (7)$$

where Z represents the corresponding time domain signal. The noisy tap clearance module 334 detects and removes any noise signal path of the time domain signal based on a threshold. If a time domain value Z(i) (i is an integer) of the time domain signal corresponds to a signal channel/tap that is lower than the threshold, the time domain value Z(i) is set to zero. Otherwise, the time domain value Z(i) remains unchanged. A discrete time domain signal, Z(1:10), before noisy tap clearance, can be represented as [Z(1), Z(2), Z(3), Z(4), Z(5), Z(6), Z(7), Z(8), Z(9), Z(10)]. In an example that ABS(Z(1:10))=[1, 10, 11, 9, 1, 2, 1, 1, 2, 15] (ABS is a function for calculating the absolute value of a complex number) and the threshold is set to be 3.5 (or any suitable number), Z(1), Z(5), Z(6), Z(7), Z(8) and Z(9) are replaced by 0 because the corresponding absolute values of these time domain numbers are smaller than the threshold of 3.5. After the noisy tap clearance, Z(1:10) turns into [0, Z(2), Z(3), Z(4), 0, 0, 0, 0, 0, Z(10)]. The FFT module 336 performs a Fast Fourier transform on convert the virtual pilot signal back to a frequency domain signal, which can be expressed as:

$$Z' = FFT(z') \qquad (8)$$

where Z' represents the frequency domain signal and z' represents the signal that is generated by the noisy tap clearance module. The phase division module 338 calculates the phase of the frequency domain signal and divides the phase of the frequency domain signal by M to obtain the channel phase information or a shifted version of the channel phase information. The channel phase or a shifted version of the channel phase can be expressed as:

$$C\_phase = \frac{phase(Z')}{M}, \quad (9)$$

where C_phase represents the channel phase or a shifted version of the channel phase (e.g., channel phase with 2*pi*k/M, k being a positive integer), Z' represents the corresponding frequency domain signal, and M represents the order of PSK modulation.

For non-differential modulated systems, such as IEEE 802.11p, noisy tap clearance can also be applied by the channel phase estimation module 316. When the modulation is not MPSK, other techniques can be used to generate virtual pilots. For example, the output of channel decoder, such as viterbi, turbo, LDPC etc, may be used to generate virtual pilots.

Turning back to FIG. 2, the channel magnitude estimation module 218 is configured to perform blind channel magnitude estimation on a received OFDM signal to obtain channel magnitude information. In some embodiments, a blind channel magnitude estimation is a channel magnitude estimation that is performed without any reference symbols (e.g., pilot symbols). The channel magnitude estimation module can detect and suppress a noise signal path of the OFDM signal.

Figure 6:
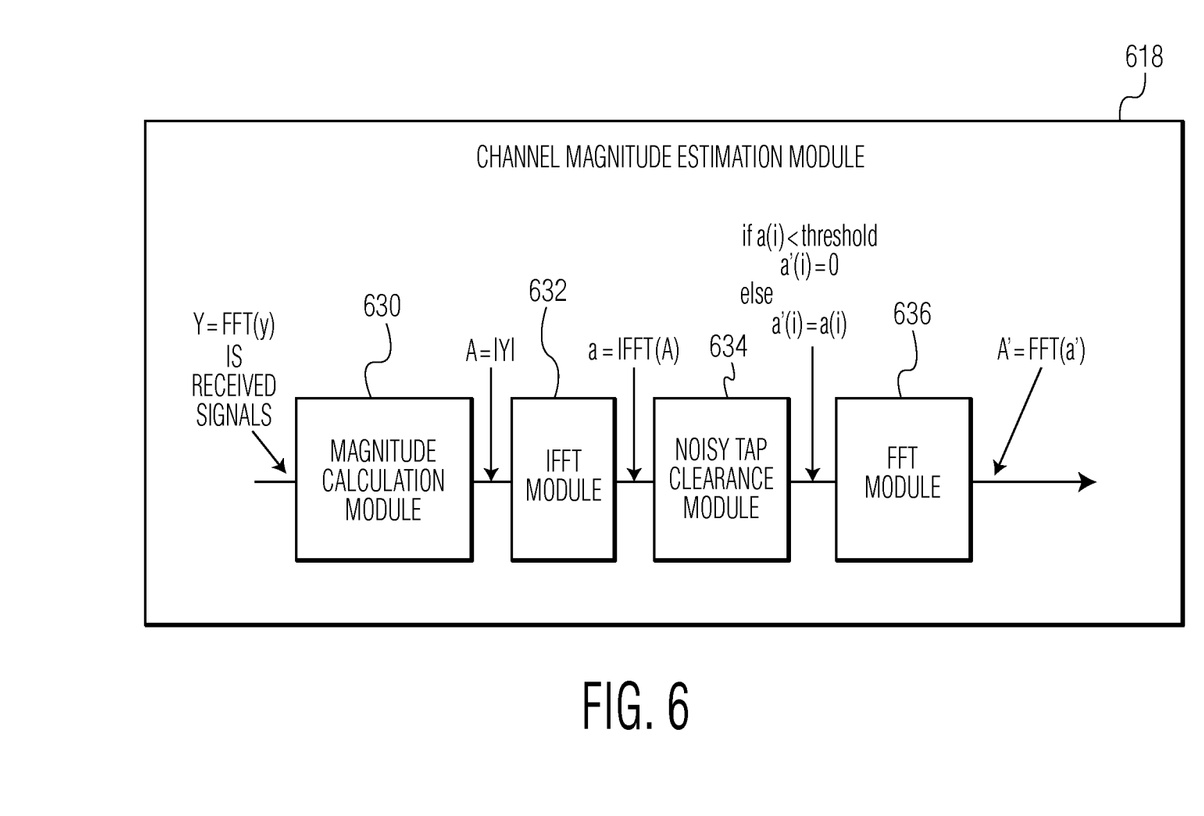
FIG. 6 depicts an embodiment of the channel magnitude estimation module depicted in FIG. 2.

FIG. 6 depicts an embodiment of the channel magnitude estimation module 218 depicted in FIG. 2. In the embodiment depicted in FIG. 6, a channel magnitude estimation module 618 includes a magnitude calculation module 630, an Inverse Fast Fourier transform (IFFT) module 632, a noisy tap clearance module 634, and an FFT module 636. Because data bits do not affect the channel magnitude, the original received signal can be used, instead of the M-th powered one. Correspondingly, the output of the FFT module is the final result of the channel magnitude estimation. The channel magnitude estimation module can be implemented in hardware, such as a processor and/or software (e.g., computer instructions) stored in a computer-readable storage medium (e.g., memory, cache, disk). The channel magnitude estimation module 618 depicted in FIG. 6 is one possible embodiment of the channel magnitude estimation module 218 depicted in FIG. 2. However, the channel magnitude estimation module 218 depicted in FIG. 2 is not limited to the embodiment shown in FIG. 6. For example, although the IFFT module and the FFT module are used in the channel magnitude estimation module depicted in FIG. 6, in other embodiments, other types of transformations (e.g., Inverse Discrete Fourier transform (IDFT) or Discrete Fourier transform (DFT)) can be performed.

The magnitude calculation module 630 is configured to calculate the magnitude of an OFDM signal. The IFFT module 632 is configured to perform an Inverse Fast Fourier transform on the OFDM signal to generate a time domain signal. In some embodiments, other types of transformations (e.g., Inverse Discrete Fourier transform (IDFT)) can be performed on the OFDM signal to generate a time domain signal. The noisy tap clearance module 634 is configured to detect and suppress a pure noise signal path of the time domain signal to generate a processed time domain signal. The FFT module 636 is configured to perform a Fast Fourier transform on the processed time domain signal to obtain the channel magnitude information. In some embodiments, other types of transformations (e.g., Discrete Fourier transform (DFT)) can be performed on the processed time domain signal to obtain the channel magnitude information.

An example of the operation of the channel magnitude estimation module 618 depicted in FIG. 6 is described as follows. The magnitude calculation module 630 calculates the magnitude of an OFDM signal. The magnitude can be expressed as:

$$A = |Y|, \quad (10)$$

where Y represents the received OFDM signal and A represents the magnitude. The IFFT module 632 performs an Inverse Fast Fourier transform on the received OFDM signal to obtain a corresponding time domain signal, which can be expressed as:

$$a = \text{IFFT}(A), \quad (11)$$

where a represents the corresponding time domain signal. The noisy tap clearance module 634 detects and removes pure noise signal paths of the time domain signal based on a threshold. If a time domain value Z(i) (i is an integer) of the time domain signal is lower than the threshold, the time domain value Z(i) is set to zero. Otherwise, the time domain value Z(i) remains unchanged. The FFT module 636 performs a Fast Fourier transform on convert the processed signal from the noisy tap clearance module 634 to a frequency domain signal, which can be expressed as:

$$A' = \text{FFT}(a') \quad (12)$$

where A' represents the corresponding frequency domain signal and a' represents the signal that is generated by the noisy tap clearance module.

Figure 7:
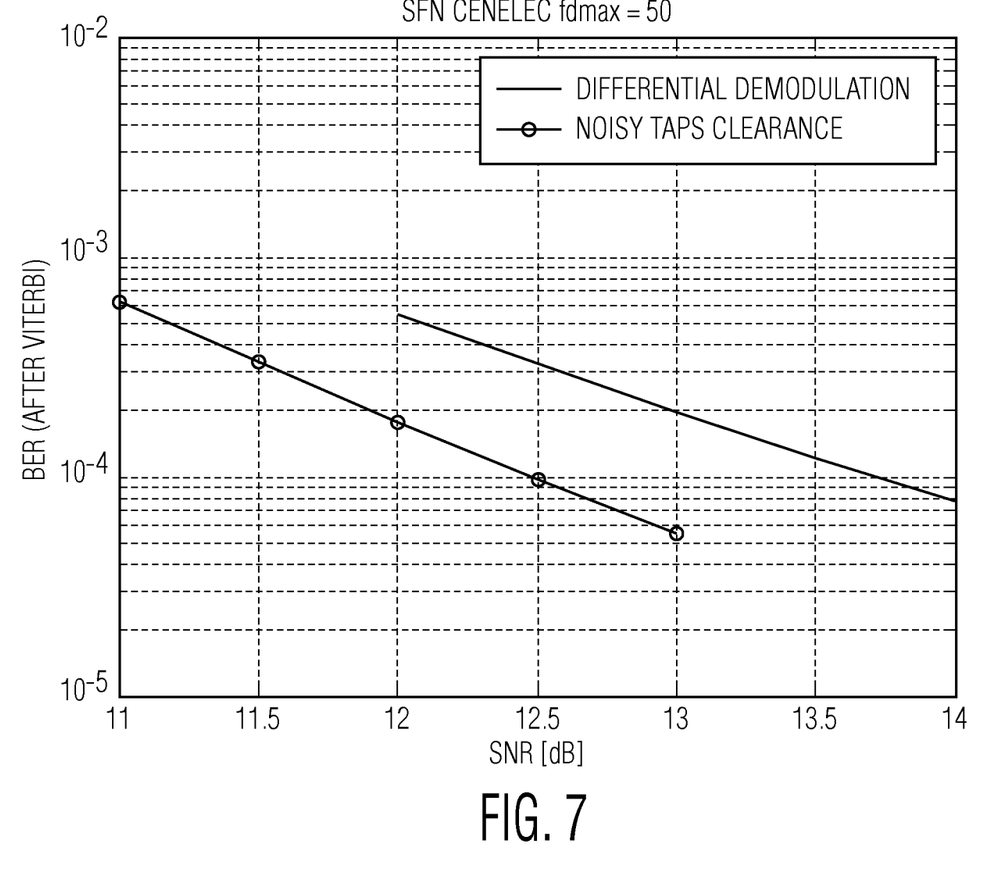
FIG. 7 shows a signal to noise ratio (SNR) versus bit error rate (BER) diagram for differential demodulation and coherent demodulation with noisy taps clearance.

FIG. 7 shows an example of performance improvement by using the noisy taps clearance technique. Specifically, FIG. 7 a graph of a signal to noise ratio (SNR) versus bit error rate (BER) diagram for differential demodulation and coherent demodulation with noisy taps clearance. The results shown in FIG. 7 are based on a DAB system, which uses differential QPSK modulation, in which the maximum Doppler frequency is set to 50 Hz. In FIG. 7, the channel estimation unit 210 introduces 1.25 dB reductions in signal to noise ratio (SNR) to reach a target bit error rate of $10^{-4}$.

Figure 8:
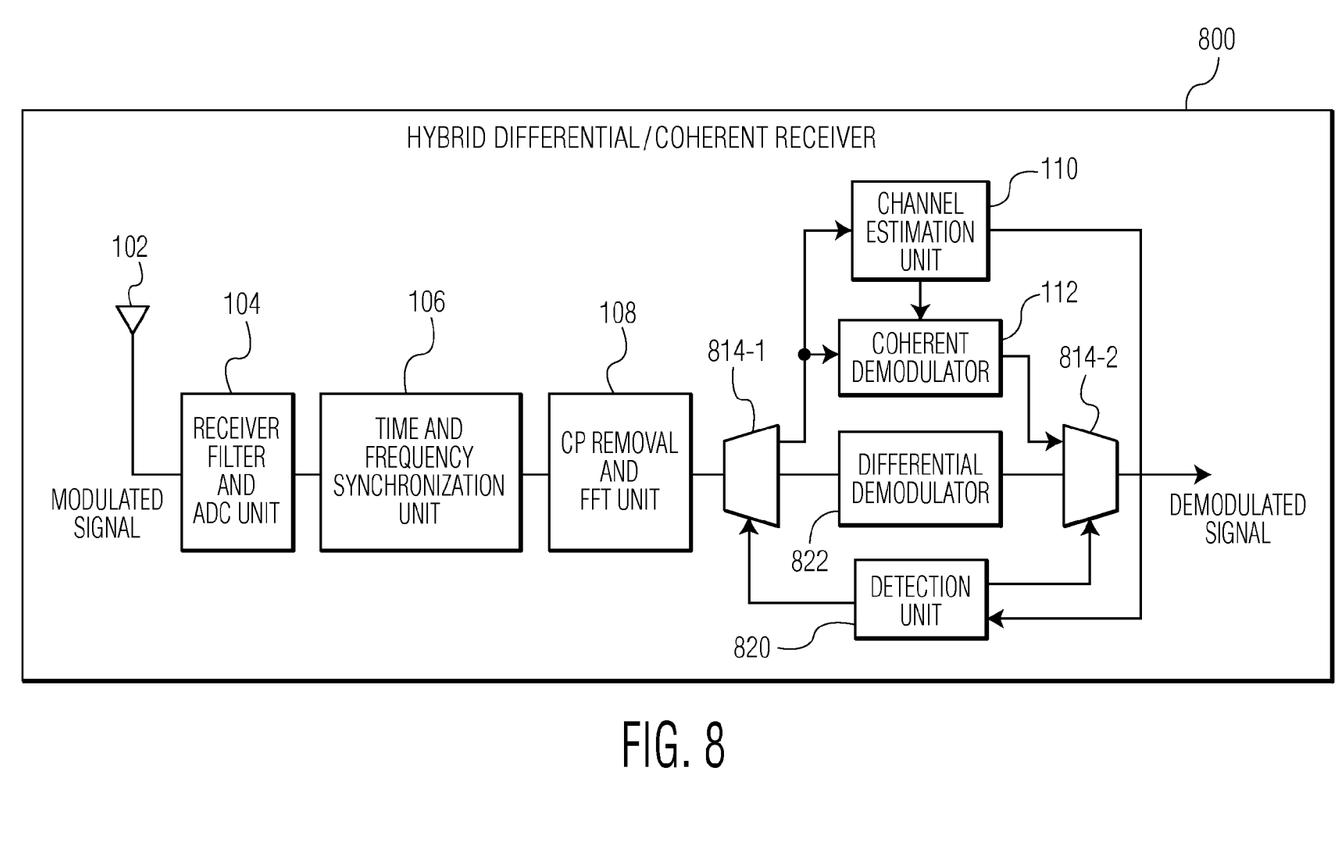
FIG. 8 depicts a hybrid differential/coherent demodulation receiver in accordance with an embodiment of the invention.

The noisy tap clearance technique works for most cases. However, compared to differential demodulation, the performance of the noisy tap clearance technique can degrade if not enough noise is filtered out or too much energy of the channel is filtered out. In order to avoid performance loss, a receiver can check whether or not relatively accurate channel estimation for coherent demodulation can be achieved. If relatively accurate channel estimation for coherent demodulation cannot be achieved, a receiver can switch to traditional differential demodulation. FIG. 8 depicts a hybrid differential/coherent OFDM receiver 800 in accordance with an embodiment of the invention. In the embodiment depicted in FIG. 8, the hybrid OFDM receiver includes the antenna unit 102, the receiver filter and ADC unit 104, the time and frequency synchronization unit 106, the CP removal and Fast Fourier transform (FFT) unit 108, the channel estimation unit 110, the coherent demodulator 112, two multiplexers 814-1, 814-2, a detection unit 820, and a differential demodulator 822. The detection unit is configured to detect the result of the channel estimation unit 110 and to cause an OFDM signal to be demodulated by the coherent demodulator or by the differential demodulator. In some embodiments, the detection unit is configured to check the number of survival signal paths/taps of the OFDM signal based on the channel phase information and the channel magnitude information from the channel estimation unit. If the number of the survival taps is smaller than a threshold, the coherent demodulator is used and coherent demodulation is performed on the OFDM signal. If the number of the survival taps is larger than the threshold, the virtual pilots are determined as being too noisy to provide accurate channel estimation. Subsequently, differential demodulation is adopted and differential demodulation is performed on the OFDM signal by controlling the multiplexers.

Figure 9:
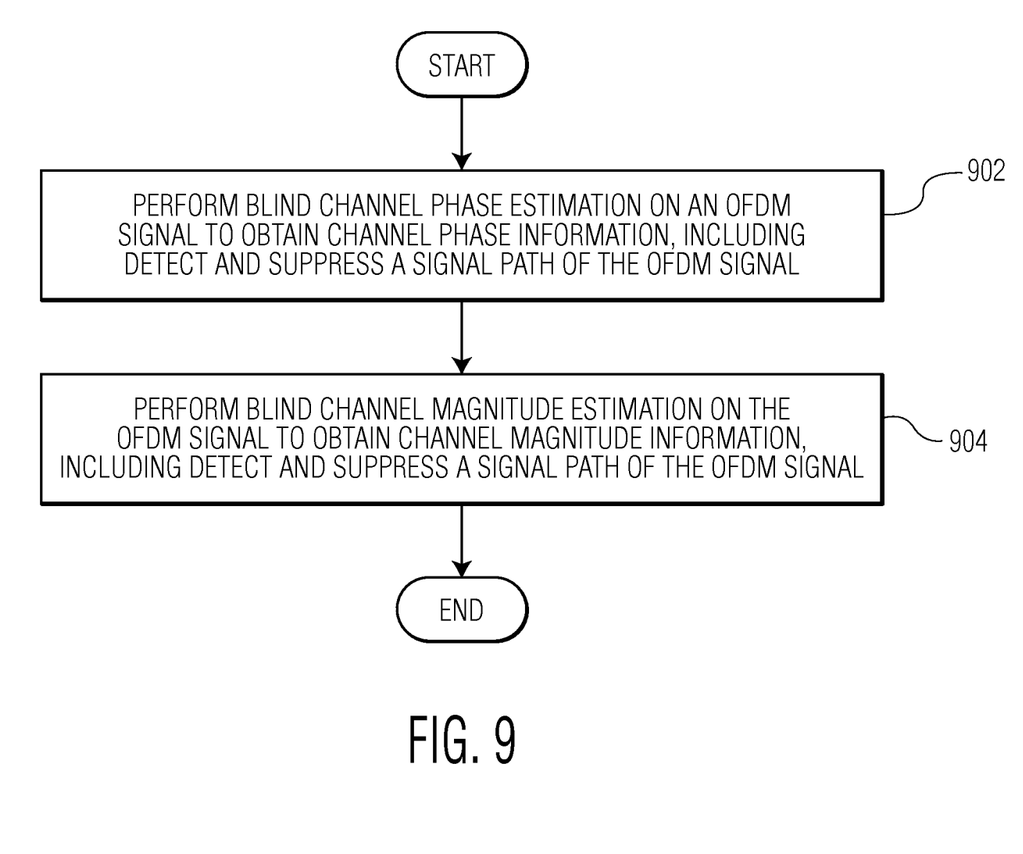
FIG. 9 is a process flow diagram of a method for performing channel estimation on an OFDM signal in accordance with an embodiment of the invention.

FIG. 9 is a process flow diagram of a method for performing channel estimation on an OFDM signal in accordance with an embodiment of the invention. At block 902, blind channel phase estimation is performed on an OFDM signal to obtain channel phase information. At block 904, blind channel magnitude estimation is performed on the OFDM signal to obtain channel magnitude information. Each of performing blind channel phase estimation on the OFDM signal and performing blind channel magnitude estimation on the OFDM signal involves detecting and suppressing a signal path of the OFDM signal.

Although the operations of the method herein are shown and described in a particular order, the order of the operations of the method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

In addition, although specific embodiments of the invention that have been described or depicted include several components described or depicted herein, other embodiments of the invention may include fewer or more components to implement less or more features.

Furthermore, although specific embodiments of the invention have been described and depicted, the invention is not to be limited to the specific forms or arrangements of parts so described and depicted. The scope of the invention is to be defined by the claims appended hereto and their equivalents.

What is claimed is:

1. A method for performing channel estimation on an Orthogonal frequency-division multiplexing (OFDM) signal, the method comprising:
   performing blind channel phase estimation on the OFDM signal to obtain channel phase information; and
   performing blind channel magnitude estimation on the OFDM signal to obtain channel magnitude information;
   wherein each of performing blind channel phase estimation on the OFDM signal and performing blind channel magnitude estimation on the OFDM signal comprises detecting and suppressing a signal path of the OFDM signal, and the method further comprising:
   determining a number of survival signal paths of the OFDM signal based on the channel phase information and the channel magnitude information;
   if the number of the survival signal paths is smaller than a threshold, performing coherent demodulation on the OFDM signal; and
   if the number of the survival signal paths is larger than the threshold, performing differential demodulation on the OFDM signal.

2. The method of claim 1, wherein the OFDM signal is a differential modulated signal.

3. The method of claim 1, wherein performing the blind channel phase estimation on the OFDM signal further comprises performing an exponentiation operation on the OFDM signal to generate an exponentiation signal.

4. The method of claim 3, wherein performing the blind channel phase estimation on the OFDM signal further comprises performing a transformation on the exponentiation signal to generate a time domain signal.

5. The method of claim 4, wherein performing the blind channel phase estimation on the OFDM signal comprises detecting and suppressing a pure noise signal path of the time domain signal to generate a processed time domain signal.

6. The method of claim 5, wherein detecting and suppressing the pure noise signal path of the time domain signal comprises removing the pure noise signal path of the time domain signal.

7. The method of claim 5, wherein detecting and suppressing the pure noise signal path of the time domain signal comprises comparing the time domain signal with a threshold.

8. The method of claim 5, wherein detecting and suppressing the pure noise signal path of the time domain signal comprises:
   comparing a time domain value of the time domain signal with a threshold, wherein the time domain value corresponds to a signal path of the time domain signal; and
   if the time domain value is lower than the threshold, reducing the time domain value.

9. The method of claim 7, wherein reducing the time domain value comprises if the time domain value is lower than the threshold, setting the time domain value to zero.

10. The method of claim 5, wherein performing the blind channel phase estimation on the OFDM signal further comprises performing a Fast Fourier transform on the processed time domain signal to generate a frequency domain signal.

11. The method of claim 10, wherein performing the blind channel phase estimation on the OFDM signal further comprises:
   calculating a phase of the frequency domain signal; and
   dividing the phase of the frequency domain signal to obtain the channel phase information.

12. The method of claim 1, wherein performing the blind channel magnitude estimation on the OFDM signal further comprises:
   calculating a magnitude of the OFDM signal; and
   performing an Inverse Fast Fourier transform on the magnitude of the OFDM signal to generate a time domain signal.

13. The method of claim 12, wherein performing the blind channel magnitude estimation on the OFDM signal comprises:
   detecting and suppressing a pure noise signal path of the time domain signal to generate a processed time domain signal; and
   performing a Fast Fourier transform on the time domain signal to obtain the channel magnitude information.

14. The method of claim 1, wherein the OFDM signal is a Phase-shift keying (PSK) modulated signal.

15. A system for performing channel estimation on an Orthogonal frequency-division multiplexing (OFDM) signal, the system comprising:
   a channel phase estimation circuit configured to perform blind channel phase estimation on the OFDM signal to obtain channel phase information; and
   a channel magnitude estimation circuit configured to perform blind channel magnitude estimation on the OFDM signal to obtain channel magnitude information,
   wherein the channel phase estimation circuit and the channel magnitude estimation circuit are configured to detect and suppress a signal path of the OFDM signal, and the system further comprising a detection circuit configured to:

determine a number of survival signal paths of the OFDM signal based on the channel phase information and the channel magnitude information;

if the number of the survival signal paths is smaller than a threshold, cause coherent demodulation to be performed on the OFDM signal; and if the number of the survival signal paths is larger than the threshold, cause differential demodulation to be performed on the OFDM signal.

16. The system of claim 15, wherein the OFDM signal is a differential modulated signal.

17. The system of claim 15, wherein the channel phase estimation circuit is configured to:

perform an exponentiation operation on the OFDM signal to generate an exponentiation signal;

perform an Inverse Fast Fourier transform on the exponentiation signal to generate a time domain signal;

detect and suppress a pure noise signal path of the time domain signal to generate a processed time domain signal;

perform a Fast Fourier transform on the processed time domain signal to generate a frequency domain signal;

calculate a phase of the frequency domain signal; and divide the phase of the frequency domain signal to obtain the channel phase information.

18. The system of claim 15, wherein the channel magnitude estimation circuit is configured to:

calculate a magnitude of the OFDM signal;

perform an Inverse Fast Fourier transform on the magnitude of the OFDM signal to generate a time domain signal;

detect and suppress a pure noise signal path of the time domain signal to generate a processed time domain signal; and perform a Fast Fourier transform on the processed time domain signal to obtain the channel magnitude information.

19. A method for performing channel estimation on an Orthogonal frequency-division multiplexing (OFDM) signal, the method comprising:

performing blind channel phase estimation on the OFDM signal to obtain channel phase information;

performing blind channel magnitude estimation on the OFDM signal to obtain channel magnitude information;

determining a number of survival signal paths of the OFDM signal based on the channel phase information and the channel magnitude information; and performing coherent demodulation or differential demodulation on the OFDM signal based on the number of the survival signal paths and a threshold;

wherein each of performing blind channel phase estimation on the OFDM signal and performing blind channel magnitude estimation on the OFDM signal comprises detecting and suppressing a signal path of the OFDM signal.

* * * * *